United States Patent
Gechman et al.

(10) Patent No.: US 11,966,319 B2
(45) Date of Patent: Apr. 23, 2024

(54) IDENTIFYING ANOMALIES IN A DATA CENTER USING COMPOSITE METRICS AND/OR MACHINE LEARNING

(71) Applicant: MELLANOX TECHNOLOGIES TLV LTD., Raanana (IL)

(72) Inventors: Vadim Gechman, Kibbutz Hulda (IL); Tamar Viclizki, Herzliya (IL); Gaby Vanesa Diengott, Kadima (IL); David Slama, Netanya (IL); Samir Deeb, Tracy, CA (US); Shie Mannor, Haifa (IL); Gal Chechik, Moshav Ben Hanan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 154 days.

(21) Appl. No.: 17/182,266

(22) Filed: Feb. 23, 2021

(65) Prior Publication Data
US 2022/0269577 A1    Aug. 25, 2022

(51) Int. Cl.
*G06F 11/00*     (2006.01)
*G06F 11/30*     (2006.01)
*G06F 11/34*     (2006.01)

(52) U.S. Cl.
CPC ...... *G06F 11/3466* (2013.01); *G06F 11/3006* (2013.01); *G06F 11/3409* (2013.01)

(58) Field of Classification Search
CPC ............. G06F 11/3006; G06F 11/3409; G06F 11/3466; G06N 20/00
See application file for complete search history.

(56) References Cited

U.S. PATENT DOCUMENTS

| | | | |
|---|---|---|---|
| 9,043,658 B1 * | 5/2015 | Marr .................. | G06F 11/2273 702/182 |
| 10,721,243 B2 | 7/2020 | Doctor et al. | |
| 10,771,500 B2 | 9/2020 | Khalimonenko et al. | |
| 11,281,552 B2 * | 3/2022 | Joglekar ............. | G06F 11/3024 |
| 11,362,910 B2 | 6/2022 | Lin et al. | |
| 2014/0165054 A1 * | 6/2014 | Wang .................. | G06F 9/45558 718/1 |
| 2016/0147583 A1 * | 5/2016 | Ben Simhon ........ | G06F 11/076 714/47.3 |

(Continued)

FOREIGN PATENT DOCUMENTS

| | | |
|---|---|---|
| CN | 108353034 A | 7/2018 |
| WO | 2014152469 A1 | 9/2014 |

OTHER PUBLICATIONS

Chen et al., "XGBoost: A Scalable Tree Boosting System," arXiv:1603.02754v3, pp. 1-13, Jun. 10, 2016.
CN Application #2022101459207 Office Action dated Oct. 28, 2023.

*Primary Examiner* — Elmira Mehrmanesh
(74) *Attorney, Agent, or Firm* — KLIGLER & ASSOCIATES PATENT ATTORNEYS LTD.

(57) ABSTRACT

A method for data-center management includes, in a data center including multiple components, monitoring a plurality of performance measures of the components. A set of composite metrics is automatically defined, each composite metric including a respective weighted combination of two or more performance measures from among the performance measures. Baseline values are established for the composite metrics. An anomalous deviation is detected of one or more of the composite metrics from the respective baseline values.

30 Claims, 6 Drawing Sheets

(56) References Cited

U.S. PATENT DOCUMENTS

| | | | | |
|---|---|---|---|---|
| 2017/0299645 | A1* | 10/2017 | Wang | G06F 11/3051 |
| 2018/0173789 | A1* | 6/2018 | Llagostera | G06N 7/005 |
| 2019/0250950 | A1* | 8/2019 | Huang | G06F 11/3452 |
| 2020/0042426 | A1* | 2/2020 | Ambichl | G06F 11/3466 |
| 2020/0162342 | A1* | 5/2020 | Fattu | H04L 43/16 |
| 2020/0264965 | A1* | 8/2020 | Harutyunyan | H04L 41/40 |
| 2020/0409780 | A1* | 12/2020 | Balasubramanian | G06F 9/547 |

\* cited by examiner

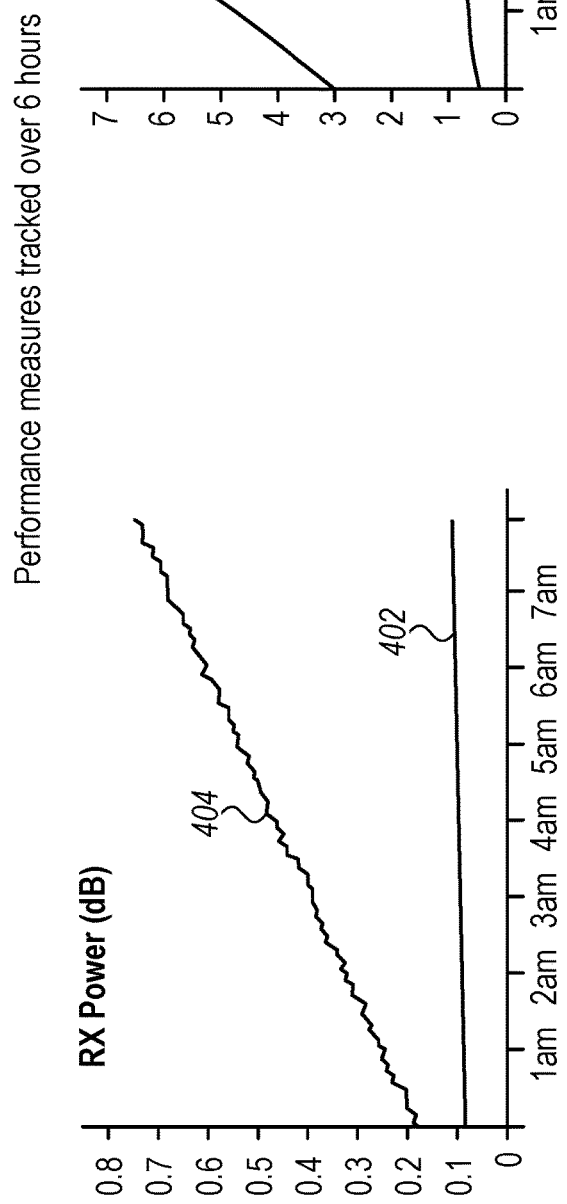
FIG. 4A
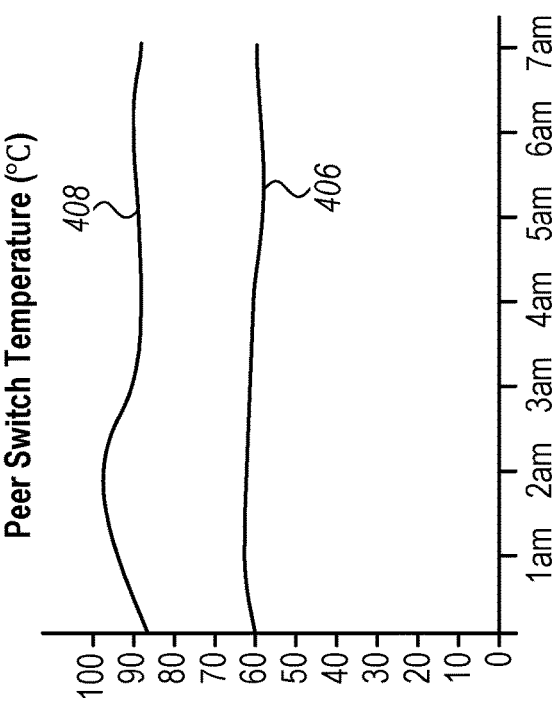
FIG. 4C
FIG. 4B

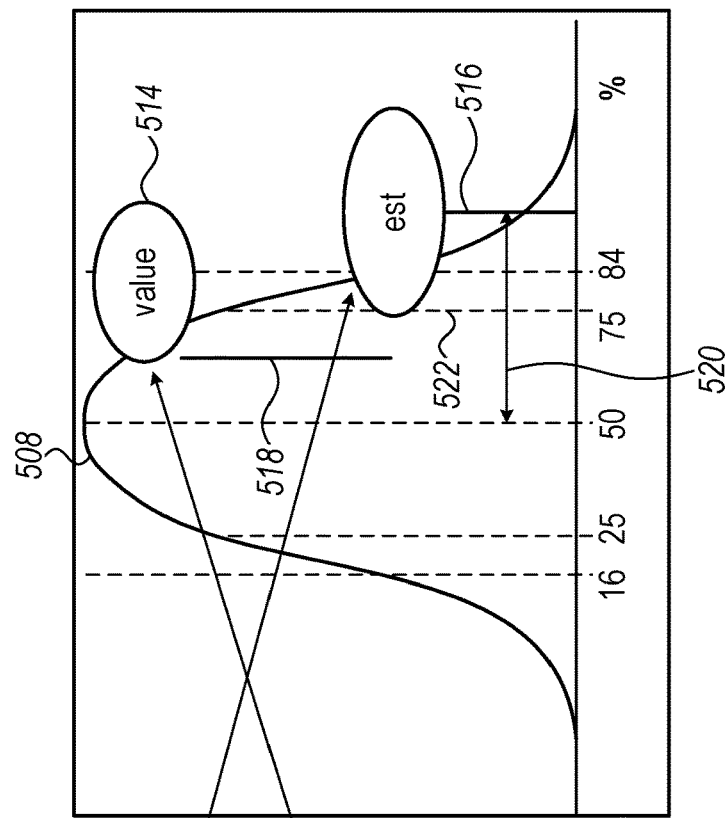
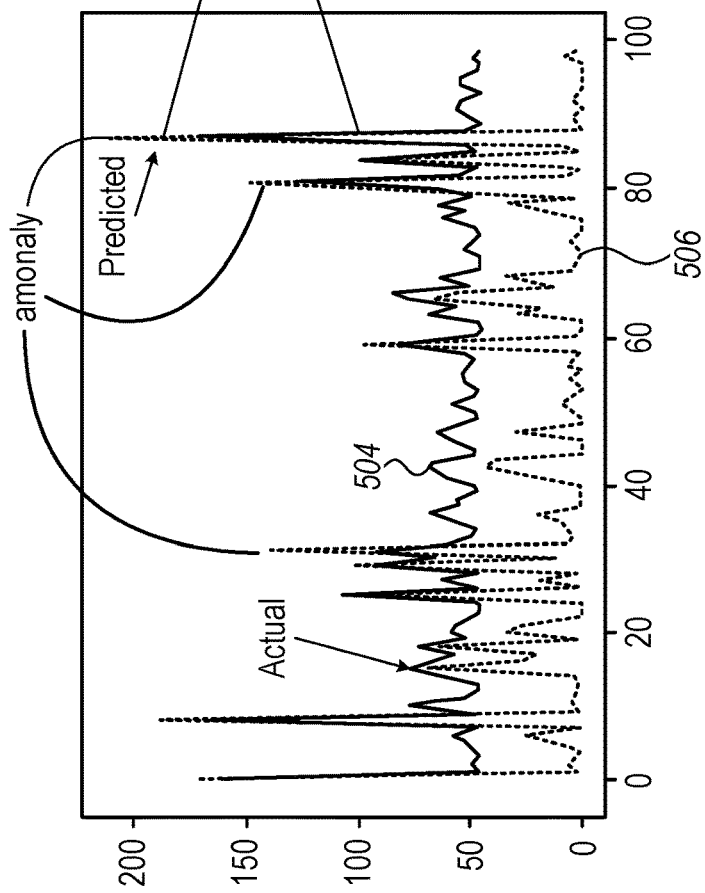
FIG. 5B
FIG. 5A

IDENTIFYING ANOMALIES IN A DATA CENTER USING COMPOSITE METRICS AND/OR MACHINE LEARNING

FIELD OF THE INVENTION

The present invention relates generally to network communications, and particularly to monitoring and management of data traffic in data-centers.

BACKGROUND OF THE INVENTION

Systems for monitoring and management of network communications have been previously proposed in the patent literature. For example, U.S. Pat. No. 10,721,243 describes a system and/or method for identifying and mitigating malicious network threats. Network data associated is retrieved from various sources across a network and analyzed to identify a malicious network threat. When a threat is found, the system performs a mitigating action to neutralize the malicious network threat. In an embodiment, a processor retrieves network data associated with at least one of an IP address or a domain, wherein the network data comprises information indicating an amount of data transceived by multiple elements of the network. The processor analyzes the network data and identifies a malicious network threat by performing the steps of: normalizing the network data to a standard format, supplementing the network data with at least one tag that identifies the network data, determining whether the network data indicates that a series of packets of a same size have been transmitted from a common location to the multiple elements of the network, determining types of ports from which the packets emanated, storing the network data in a database, weighting the network data according to a threat associated with the network data, wherein the network data is related to the packets and wherein weighting the network data is based on the types of ports from which the packets emanated, and generating a risk score for the weighted data. Based on the risk score for the weighted data, the processor performs a mitigating action to neutralize the malicious network threat, wherein the mitigating action comprises at least one of a null routing the malicious network threat, publishing a list identifying a bad actor committing the malicious network threat, or logically separating the IP address or domain from the network.

As another example, Chinese Patent CN 108353034B describes a central infrastructure monitoring system that includes an asset configurator and a plurality of data center infrastructure monitoring systems. Each data center infrastructure monitoring system is associated with a respective data center of the plurality of geographically distributed data centers, the plurality of distributed data centers including one or more physical infrastructure assets of a plurality of physical infrastructure assets for supporting system operations within the respective data center. The asset configurator is configured to define templates of standard attributes for a plurality of infrastructure assets based on information about the plurality of infrastructure assets of the plurality of data centers, generate infrastructure asset data logically representing a plurality of physical infrastructure assets based on the defined templates, and associate, via the infrastructure asset data, the physical infrastructure assets within an infrastructure asset hierarchy indicating connections and interdependencies between the plurality of infrastructure assets.

U.S. Pat. No. 10,771,500 describes systems and methods for detecting distributed denial-of-service (DDoS) attack. An exemplary method includes receiving one or more requests from a first user for a service executing on a server, and generating a first vector associated with the first user comprised of a plurality of characteristics indicative of the first user accessing the service; calculating a comparison between the first vector and a reference vector, wherein the reference vector comprises an averaged distribution of characteristics for a plurality of users accessing the service, and determining that the service is under a denial-of-service attack based on the comparison between the first vector and the reference vector. System modules may be implemented as actual devices, systems, components, a group of components realized with the use of hardware, such as a microprocessor system and a set of software instructions.

SUMMARY OF THE INVENTION

An embodiment of the present invention that is described hereinafter provides a method for data-center management, the method including, in a data center including multiple components, monitoring a plurality of performance measures of the components. A set of composite metrics is automatically defined, each composite metric including a respective weighted combination of two or more performance measures from among the performance measures. Baseline values are established for the composite metrics. An anomalous deviation is detected of one or more of the composite metrics from the respective baseline values.

In some embodiments, detecting the anomalous deviation includes combining multiple deviations of multiple respective composite metrics to produce a combined deviation, and detecting the anomaly in the combined deviation.

In some embodiments, automatically defining the set of composite metrics includes running a Machine-Learning (ML) process that automatically performs one or more of (i) selecting groups of performance measures to be combined so as to form the composite metrics, and (ii) assigning weights to the performance measures in the composite metrics.

In an embodiment, detecting the anomalous deviation includes running a repetitive automated process that (i) monitors the performance measures, (ii) updates a definition of the composite metrics responsively to the monitored performance measures, and (iii) compares the updated composite metrics to the respective baseline values.

In another embodiment, the method further includes updating the baseline equations during at least some repetitions of the repetitive automated process.

There is additionally provided, in accordance with another embodiment of the present invention, a method for data-center management, the method including, in a data center including multiple components, monitoring a plurality of performance measures of the components. A set of composite metrics is automatically defined, each composite metric including a respective weighted combination of two or more performance measures from among the performance measures. A potential anomaly pattern is derived for one or more of the components based on the composite metrics.

In some embodiments, deriving the potential failure pattern includes estimating future anomaly times of the components.

In an embodiment, the method further includes repeatedly updating the estimated future anomaly times based on newly collected composite metrics.

There is further provided, in accordance with another embodiment of the present invention, a method for data-center management, the method including running a plurality of software applications in a data center including multiple hardware components. A mapping is automatically derived, that specifies (i) for each software application, a respective subset of one or more of the hardware components that are used by the software application, and (ii) for each hardware component, a respective subset of one or more of the software applications use the hardware component. Performance is monitored, of the software applications and of the hardware components, and an anomalous event is identified based on the monitored performance and on the mapping.

In some embodiments, identifying the anomalous event includes detecting anomalous performance of one or more of the hardware components, and, using the mapping, identifying one or more of the software applications associated with the anomalous performance.

In an embodiment, identifying the anomalous event includes detecting anomalous performance of one or more of the software applications, and, using the mapping, identifying one or more of the hardware components associated with the anomalous performance.

In some embodiments, automatically deriving the mapping includes (i) establishing a baseline performance pattern for the software applications and the hardware components, and (ii) updating the mapping in response to detecting an anomalous deviation from the baseline performance pattern.

There is further more provided, in accordance with another embodiment of the present invention, a system for data-center management, the system including an interface and a processor. The interface is configured to monitor a plurality of performance measures of multiple components in a data center. The processor is configured to (i) automatically define a set of composite metrics, each composite metric including a respective weighted combination of two or more performance measures from among the performance measures, (ii) establish baseline values for the composite metrics, and (iii) detect an anomalous deviation of one or more of the composite metrics from the respective baseline values.

There is additionally provided, in accordance with another embodiment of the present invention, a system for data-center management, the system including an interface and a processor. The interface is configured to monitor a plurality of performance measures of multiple components in a data center. The processor is configured to (i) automatically define a set of composite metrics, each composite metric including a respective weighted combination of two or more performance measures from among the performance measures, and (ii) derive a potential anomaly pattern for one or more of the components based on the composite metrics.

There is further provided, in accordance with another embodiment of the present invention, a system for data-center management, the system including an interface and a processor. The interface is configured to is configured to communicate with a data center that includes multiple hardware components and that runs a plurality of software applications. The processor is configured to (a) automatically derive a mapping that specifies (i) for each software application, a respective subset of one or more of the hardware components that are used by the software application, and (ii) for each hardware component, a respective subset of one or more of the software applications use the hardware component, and (b) monitor performance of the software applications and of the hardware components, and identify an anomalous event based on the monitored performance and on the mapping.

The present invention will be more fully understood from the following detailed description of the embodiments thereof, taken together with the drawings in which:

BRIEF DESCRIPTION OF THE DRAWINGS

FIGS. 4A-4C are graphs that show actual vs. expected values of several performance measures, in accordance with an exemplary embodiment of the present invention;

FIGS. 5A and 5B are graphs that show monitoring information comprising anomaly events, and a scoring process of one of the anomalies, respectively, in accordance with an embodiment of the present invention.

DETAILED DESCRIPTION OF EMBODIMENTS

Overview

Figure 1:
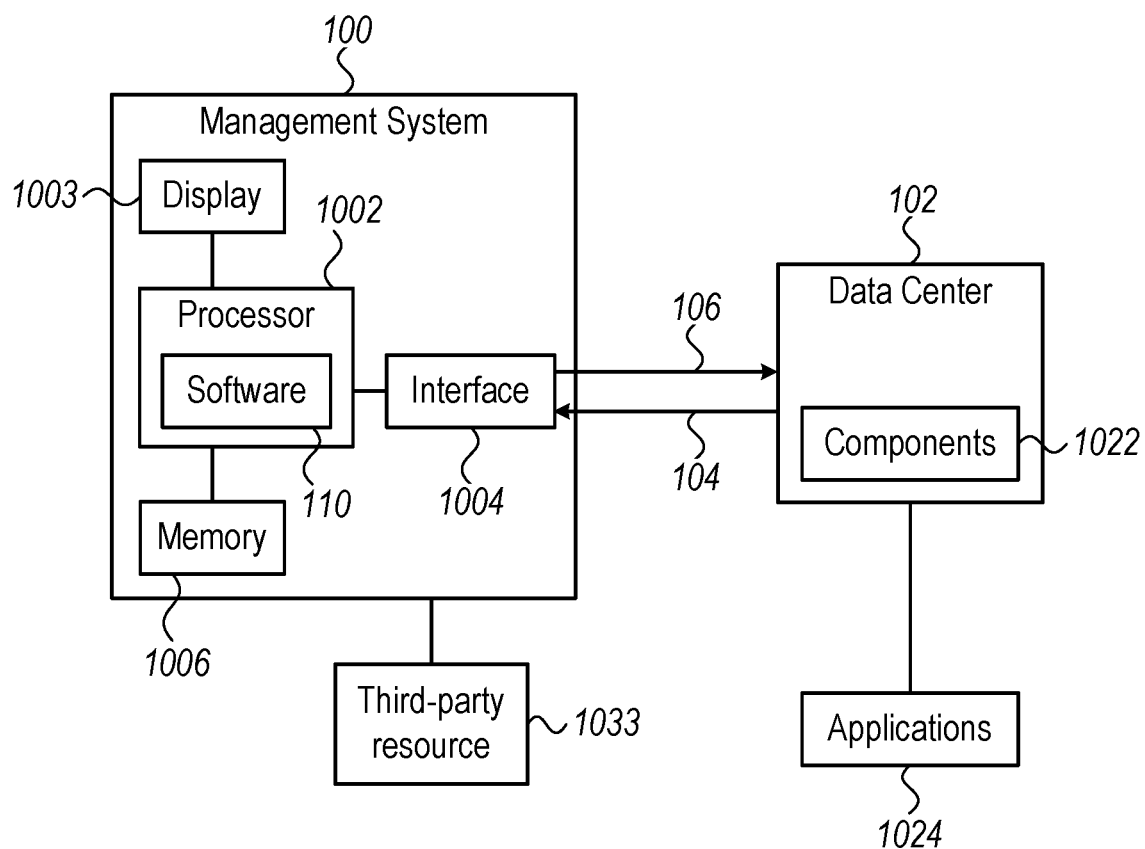
FIG. 1 is a schematic block diagram of a management system of a data center, in accordance with an exemplary embodiment of the present invention.

Communication infrastructure may require comprehensive management for various reasons, one example being to facilitate preventive maintenance where such a management system detects a risk of hardware failure and estimates the timing of such a failure. As another example, a management system can detect and mitigate cyberattacks on the infrastructure.

However, it is often hard to obtain and present indications of adverse events, such as described above, in a useful manner. For example, a single, benign indication of hardware function, such as a temperature of a network component (e.g., network interface cards, storage devices, switches, plugs, and others) may cause a false alarm or an untimely service call. As another example, network traffic varies significantly based on applicative use, geography, network topology and more. Thus, the information in these packets is noisy, non-uniform and does not lend itself easily to productive monitoring.

Embodiments of the present invention that are described hereinafter provides network management systems and methods that cover several key areas of network monitoring including: anomaly detection; failure prediction; and cyber-threat intelligence. The disclosed technique includes defining composite metrics to reliably detect anomalies, where such composite metrics dynamically change, for example, according to a baseline that is determined and subsequently updated by a management system.

In one embodiment, a provided management system is configured to monitor (e.g., using telemetry and analytics tools) a plurality of performance measures of the components in a data center comprising multiple hardware and software components. The performance measures are collected by interface circuitries of the management system, where to this end, the interface circuitries communicate with a data center that comprises multiple hardware components and that runs a plurality of software applications. Such measures may comprise, for example, any one or more of: bit or frame error rate; data rate; operating temperature; power consumption; up and down times; and any other appropriate measures. The management system receives such network component information in an interface linked to the network; the network component information may comprise parameters that might be consumed by rogue applications running in the data center. Specifically, such parameters can be used in detecting rogue or unauthorized applications running in the data center that are associated with cyber-attacks.

The management system comprises a processor that runs an algorithm which automatically defines a set of composite metrics. Each composite metric comprises a respective weighted combination from among two or more of performance measures collected by interface circuitries of the management system. The weighted combinations used in the various composite metrics are derived from correlations detected among performance measures. To this end, the processor runs a machine learning (ML) algorithm that identifies correlations among performance measures in order to select a proper set of performance measures per composite metric. A particular non-limiting example of such an ML algorithm is the XGboost gradient boosting algorithm, which is particularly suitable for producing a prediction model in the form of an ensemble of decision trees that represent an evolving subset of correlated performance measures to be used in constructing composite metrics.

The processor establishes baseline equations for the constructed composite metrics, and detects an anomalous deviation of one or more of the composite metrics from the respective baseline equations.

In an embodiment, after detecting a deviation in a total anomalous sum (e.g., in an anomaly sum as defined in Eq. 2 below), the processor performs a "drill-down" process that aims to identify one or more of the performance measures that are the dominant contributors to the alerted deviation of the total anomaly sum. To this end, a statistical estimation is provided, such as in number of standard deviations, or a number of median absolute error (MAE) deviations, to estimate a deviation of the actual performance of a performances measure from its expected performance. The drill-down may include estimating a degree of severity of leading performance measures contributors to the given deviation out of the total anomaly score of Eq. 2.

A non-limiting example of detecting an anomalous deviation per feature is using an anomaly score that provides a statistical estimation, such as in a number of standard deviations, or a number of Mean Absolute Errors (MAEs) from a baseline value of the feature value (i.e., metrics value), and assigning a degree of severity according to the number of standard deviations or MAEs.

For example, the processor may use the composite metrics of a weighted sum of power consumption, component temperature, and bit error rate, where only divergence of the composite metrics is meaningful, as described below. In practice, composite metrics may be a weighted sum of multiple monitored parameters, each of which, separately, has partial estimated measurements. If the composite metrics deviates above a given threshold value of standard deviations from its baseline, the processor indicates an imminent risk and indicates which of the top k (e.g., top 3) performance measures (i.e., features) out of n such, ranging $\{0 \ldots,$ count of all features$\}$ performance measures (i.e., features), where the top k features (e.g., power consumption and/or component temperature and/or bit error rate) are the dominant contributors to the alerted anomaly among the features monitored.

In some embodiments, the processor automatically defines the set of composite metrics by running an ML process that automatically performs one or both of the following: (a) selects groups of performance measures to be combined so as to form the composite metrics, and/or (b) assigns weights to the performance measures in the composite metrics. To meet the dynamic environment of a network, the processor detects the anomalous deviation by running a repetitive automated process that (i) monitors the performance measures, (ii) updates a definition of the composite metrics responsively to the monitored performance measures, and (iii) compares the updated composite metrics to the respective baseline values. During this repetitive automation the processor may further update the baseline equations at least on some occasions of the repetitive automated process.

In another embodiment, the management system is configured to derive a potential anomaly pattern for one or more of the components based on the data measurements which were learnt over one month. In this embodiment, the disclosed technique trains ML algorithms to predict future failures by collecting monitoring information (e.g., training data for the ML algorithms) over a time duration (e.g., 1 to 8 hours before the time of collection) in advance of (retrospectively known) previous failures that occurred and having the ML algorithms learning measurements' relations over time.

Using the ML algorithm, the processor derives the potential failure pattern by, for example, alerting future failure times of the components. The processor repeatedly updates the alerted future failure times based on newly collected failures.

In yet another embodiment, a management system is configured to automatically derive a mapping (e.g., one that is presented on a GUI), in a data center comprising multiple components, that specifies (i) a respective subset of one or more of the hardware components that are used by the software application for each software application, and (ii) a respective subset of one or more of the software applications used in each hardware component. The management system monitors performance of the hardware components and of the software applications to identify an anomalous event based on the monitored performance and on the mapping.

In an example embodiment, the disclosed technique includes a daily process of creating an updated mapping file. An hourly process is implemented that uses this file to get updated mapping.

In one scenario, the management system identifies the anomalous event by detecting anomalous performance of one or more of the hardware components, and, by using the mapping, identifies one or more of the software applications associated with the anomalous performance. In another scenario, the management system identifies the anomalous event by detecting anomalous performance of one or more of the software applications, and, by using the mapping, identifies one or more of the hardware components associated with the anomalous performance.

In both of the above scenarios, automatically deriving the mapping comprises (a) establishing a baseline performance pattern for the hardware components and the software applications, and (b) updating the mapping in response to detecting an anomalous deviation from the baseline performance pattern.

Further to all of the above, the disclosed technique gives visibility to the network condition by storing a history (e.g., of a month's duration of monitoring) of the network and analyzing the composite metrics in relation to that history.

By providing a management system using composite metrics/relations capable of anomaly detection, failure prediction, cyberthreat intelligence, and fabric visibility, the disclosed technique (in exemplary embodiments) gives an all-in-one network monitoring solution.

Various responsive actions can be taken in case of future failure detection. These may include, by way of example, changing the path of traffic where a problematic node is excluded from available nodes, or redefining in software available ports for redirecting. In case of a Cyber Security issue, such as when detecting suspicious activity in irregular hours, the relevant application can be dropped, and/or any other suitable responsive action can be taken.

System Description

FIG. 1 is a schematic block diagram of a management system 100 of a data center 102 where system 100 manages at least portion of data center 102 activities, in accordance with an exemplary embodiment of the present invention. In the depicted embodiment, management system 100 comprises a processor 1002 linked with a display 1003, an interface 1004 and a memory 1006 that stores software 110 which processor 1002 runs to perform disclosed functions of system 100. The software 110 typically includes an ML algorithm, such as (by way of non-limiting example) the aforementioned XGboost algorithm to construct composite metrics and relations (e.g., equations) between measurements from a subset of performance measures found by the ML algorithm to be correlated, out of an available set of performance measures.

Data center 102 comprises multiple hardware components 1022 (e.g., computers, network adapters, storage devices, packet switches, cables, plugs and more) used by applications 1024. Examples of applications 1024 may comprise video streaming, distributed computing, database applications, and many others.

System 100 may be located as part of data center 102 by as appliance, for example, utilizing a processor, interface and memory of the data center.

As seen, an interface 1004 of system 100 receives (over a link 104) real-time telemetry and network and data traffic parameters from data center 102, to monitor a plurality of performance measures of the components of data center 102. Typical telemetry received from components 1022 includes physical parameters, such as temperature, power consumption, etc. Typical network and data traffic parameters received include ports in use, data rate per port, and error rates per link.

Using software 110, processor 1002 of management system 100 is capable of providing anomaly detection, failure prediction, cyberthreat intelligence, and fabric visibility of data center 102.

In one embodiment, a user may monitor events on display 1003 and initiate a response, including sending commands to data center components 1022 (via a link 108), to mitigate an imminent hardware failure or a cyberattack. Additionally, or alternatively, processor 1002 may initiate a response automatically, without user intervention. An example of such a response is moving traffic from an imminently failing path to another path.

In another embodiment, a user and/or processer 102 may additionally, or alternatively, send an alarm to a third-party resource 1033.

Management System Description

Figure 2:
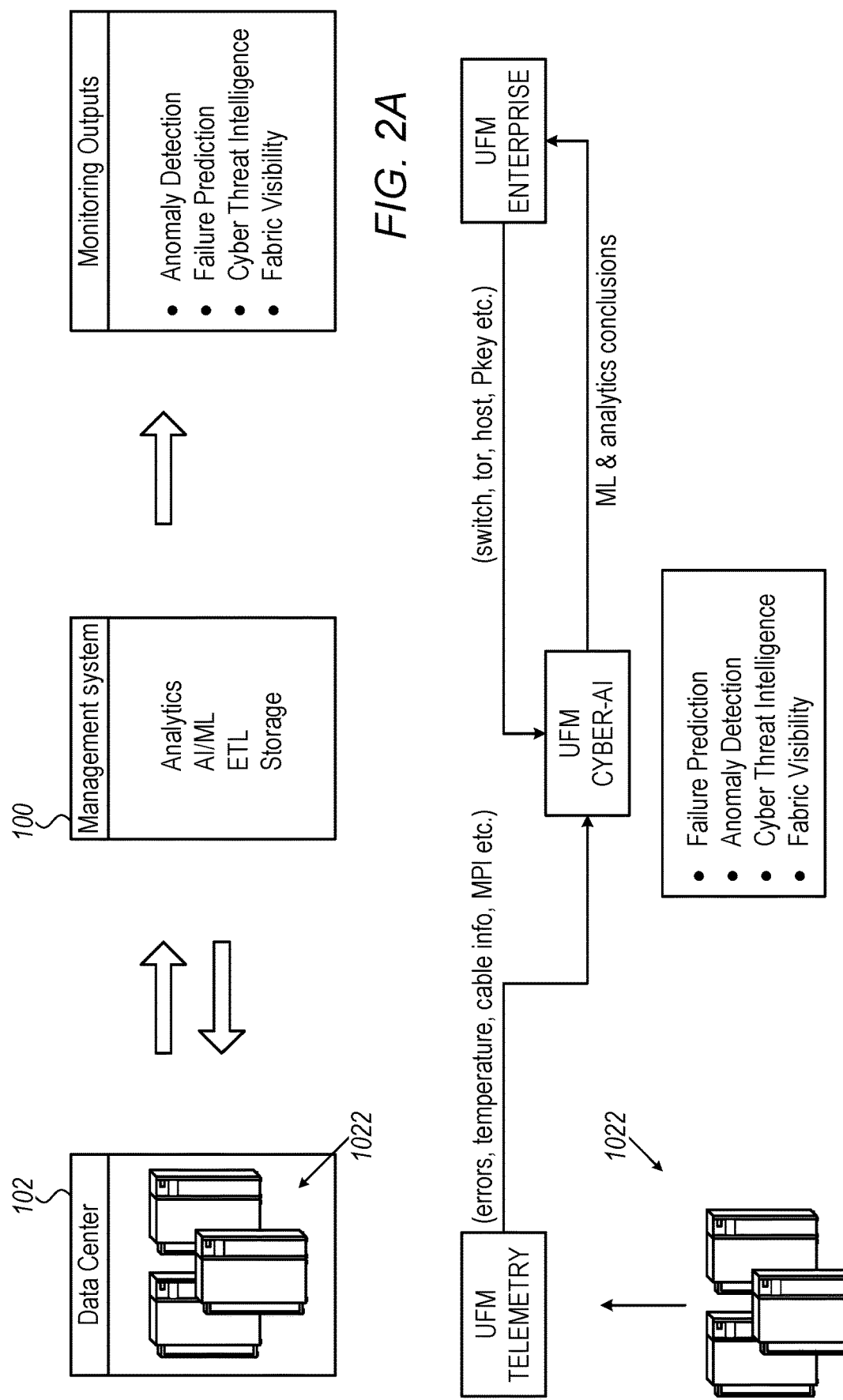
FIGS. 2A and 2B are schematic, pictorial diagrams of functionalities of the system of FIG. 1, with FIG. 2B presenting unified fabric manager (UFM) versions that run these functionalities, in accordance with an exemplary embodiment of the present invention.

FIGS. 2A and 2B are schematic, pictorial diagrams of functionalities of system 100 of FIG. 1, with FIG. 2B presenting unified fabric manager (UFM) versions that run these functionalities, in accordance with an exemplary embodiment of the present invention. (UFM® is a registered trademark of Nvidia and Mellanox.) FIG. 2A shows data center 102 having components 1022 in bi-directional communication with management system 100 that runs tools belonging to a class of analytics, AI and additional tools to monitor data center 102. Management system 100 provides monitoring outputs such as the aforementioned anomaly detection, failure prediction, cyberthreat intelligence, and fabric visibility.

FIG. 2B shows a commercial embodiment of the management system in the form of three platforms of UFM tools: a telemetry platform, a data analysis enterprise platform and a cyber-AI platform that runs the aforementioned ML/AI applications.

The NVIDIA® Mellanox® UFM® platforms provide data center networking management by combining enhanced, real-time network telemetry with AI-powered cyber-intelligence and analytics to support scale-out InfiniBand data centers.

These three UFM platforms empower data center operators to efficiently provision, monitor, manage and preventatively troubleshoot and maintain the data center fabric, to realize higher utilization of fabric resources to give a competitive advantage, while reducing operational costs.

Figure 3:
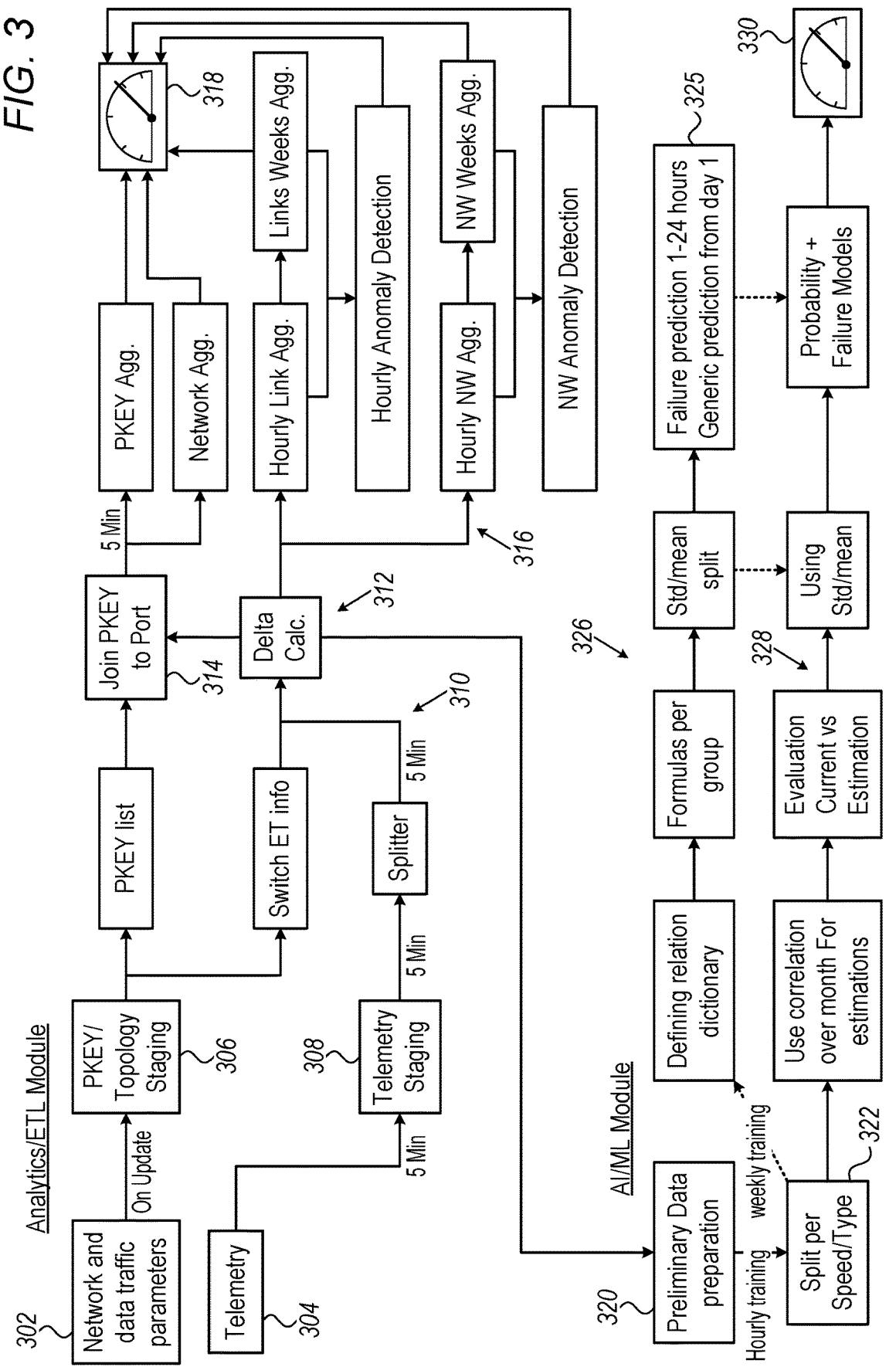
FIG. 3 is a flow chart schematically describing a method for managing a data center using the system of FIG. 1, in accordance with an exemplary embodiment of the present invention.

FIG. 3 is a flow chart schematically describing a method for managing a data center 102 using management system 100 of FIG. 1, in accordance with an exemplary embodiment of the present invention. The process can be divided between two families of tools. One family uses tools, comprising analytics and "extract, transform, load" (ETL), that include collecting metadata and telemetry from network components (by management system 100). The other family is of AI/ML tools applied by management system 100 to the metadata and telemetry information.

The analytics/ETL phase of the process begins with management system 100 collecting network data and traffic parameters (e.g., metadata) on metadata acquisition step 302. This step recurs with an update time period. The ETL process generates several types of aggregations, such as, for example, a weekly average calculation per Node and Port, and average calculation of corresponding hours in the same days averaged over several weeks.

In parallel, management system 100 collects telemetry data in prespecified intervals (e.g., five minutes), at a telemetry acquisition step 304.

At staging steps 306 and 308, processor 1002 of management system 100 combines a programmable key (pkey) topology with network telemetry allowing monitoring of pkey performance.

Next, at a data arranging step 310, processor 1002 arranges data per stage and records per time. In step 312, processor 1002 calculates changes (referred to as the "delta") that occurred within network data, traffic parameters and in telemetry data. Then the processor joins the Pkey per node and port, so that data can be tracked, at an Pkey joining step 314.

At a derivation step 316, processor 1002 derives network information comprising, network aggregation, links weekly aggregation, hourly anomaly detection, network weekly aggregation, and NW anomaly detection. The information derived in step 316 is presented by the processor at a presenting step 318, for example on display 1003 of management system 100.

The AI/ML phase of the process begins with management system 100 performing preliminary delta data preparation, to be used in a subsequent drill-down investigation discussed above, in case an of an alert of an anomaly. Such delta data preparation may include determining a mean of each counter per port, calculating hourly average, updating added cables data, logging defined correlations, updating defined relations dictionary, and evaluating (e.g., comparing) current hourly data to expected average calculations (i.e., estimations) of data described above.

Next, processor 1002 splits (322) the data according to relevant data types, with one branch of the ML algorithm providing (326) hourly/daily basis information analysis, and the other branch providing (328) monthly models, correlation dictionary and mean and std per counter for each node and port. Both branches include ML generating composite metrics from correlated sunsets of performance measures, as described above.

The hourly/daily basis analysis results in anomaly scores (derived in FIGS. 5 and 6), and in accuracy from failure models (326), including estimating chances of failures over 1-24 hours, in a prediction step (325) or probabilities from learnt mean and std per device. The anomaly score probabilities of devices and devices future failures are presented (330) by the processor at a presenting step 318, for example on display 1003 of management system 100. Examples of failures include network component shutdowns and traffic over-congestion that leads to communication breaks.

Specifically, during steps 326 and 328, processor 1002 of management system 100 sets a plurality of performance measures to be used with the metadata and the telemetry information. The set performance measures may vary between the aforementioned prespecified intervals and update timings, depending, for example, on user selection or outcome of the AI/ML algorithm. Example of performance measures are:
  Data traffic rates
  Bit or frame error rates
  Congestion rate
  Hardware malfunctions
  Hardware power consumption The processor uses the performance measures to calculate composite metrics, and analyzes these metrics to indicate the aforementioned probabilities, as described below, in FIGS. 5 and 6.

Anomaly Detection and Scoring

In some embodiments, once the anomaly is detected, a user can choose specific anomaly events and see actual vs. average performance measures for a specific device.

FIGS. 4A-4C are graphs that show actual vs. expected values of several performance measures, in accordance with an exemplary embodiment of the present invention.

The performance measure graphs are for a specific time range which can be, for example, the last 1/6/12/24 hours, the last week or the last month's tracking. FIG. 4A shows a optical cable power consumption, and, as seen, while historical average power (402) is flat, the actual power consumption 404 rises. This tendency of a power consumption performance measure by itself is an insufficient metric to indicate an imminent problem.

FIG. 4B shows the peer switch temperature, and, as seen, the expected temperature (406) is considerably lower than the actual temperature (408) of the component. Again, this tendency of a component temperature performance measure by itself is an insufficient metric to indicate an imminent problem.

Finally, FIG. 4C shows normalized data congestion percentage by the component. As seen, historical data congestion (e.g., traffic rate as fraction of capacity) 410 is far lower than the (412) actual percentage of data congestion. Once more, as an isolated metric, such a tendency by itself of data congestion performance is an insufficient metric to indicate an imminent problem.

To detect anomaly behavior, the disclosed technique utilizes composite metrics for a component x of the data center defined as $$\text{Composite\_metric}(x) = \sum_{i=1:N} w_i \cdot (\text{performace\_measure}(x)) \qquad \text{Eq. 1}$$

with the weights $w_i$ summing to one. The number N of performance measures can range from several to dozens. Using a composite metric means looking for correlations between different performance measures. An anomaly, which may indicate an abnormal behavior, is declared only if a composite metric shows a deviation above threshold, as described below. An occurrence of persistent anomaly (e.g., one that recurs with a given time duration of monitoring, such as over several hours of monitoring) may set a criterion to such anomaly detection.

In general, the monitored element x may be a component or another, more abstract, entity of the data center, such as a combination of elements, or topology function. The composite metric is brought purely by way of example, and other definitions (e.g., a non-linear definition) may be used.

FIGS. 5A and 5B are graphs that show monitoring information comprising anomaly events, and a scoring process of one of the anomalies, respectively, in accordance with an exemplary embodiment of the present invention. The graph of FIG. 5A presents the example of a significant recurring anomaly for a specific set of data calculated from a composite metric. As seen, over 100 samples, Sample #1, Sample #2 . . . , Sample #100 over time, that can be five minutes separated in time from one another, are accumulated to cover approximately six hours of monitoring. During the six hours, the processor of the management system raised an alert of anomaly at least three times.

In FIG. 5A, curve 504 is the estimated composite metric based on Eq. 1 and the curve 506 is the actual composite metric based on Eq. 1. For example, curve 504 may be based on estimated performance measures. The graphs are vertically shifted for clarity.

The example of FIG. 5A is brought purely by way of example. Any other suitable probability distributions may be used in defining an anomalous event.

As seen, the actual values may deviate from predicted values and may indicate an anomaly. A threshold of such deviation is defined, for example, using a measure of a sum of the deviations of composite metrics (i.e., sum of deviations of feature values, also referred to herein as "Anomaly Sum"):

$$\text{Anomaly\_Sum} = \sum_{x=feature\_1}^{feature\_n} Anomaly_{score(x)} = \qquad \text{Eq. 2}$$

$$\sum_{x=feature\_1}^{feature\_n} \frac{|\text{Actual\_feature\_value}(x) - \text{Expected\_feature\_value}(x)|}{MAE(x)}$$

In Eq. 2, the term feature_value means the same as Composite_metric value.

For a normal distribution having a standard deviation a use case of Eq. 2, median absolute error (MAE). In an embodiment, an anomaly score above a given threshold value differentiates an improbable event that is thus considered a true anomaly, from a probable deviation that is benign (e.g., defines a deviation that, upon detection, triggers an alert).

While Eq. 2 is defined as a sum of deviations, a sum is only one example of combining the deviations. In alternative embodiments, any other suitable function that combines two or more individual deviations may be used, such as a multiplication of the deviations' absolute values. In general, the processor may combine multiple deviations of multiple respective composite metrics to produce a combined deviation, and detect the anomaly in the combined deviation In addition, once the anomaly is detected, a drill-down process may be performed, for checking the performance of specific hardware via its own behavior using standard deviation distribution (std) comparison.

In case of matching between both general (e.g., anomaly sum) anomaly detection and a detection done per device in any other way, such as using the above mentioned std comparison, the device will be defined as showing an anomalous behavior.

In FIG. 5A there are three samples in which the anomaly score of Eq. 2 exceeds a threshold.

To gather more insight into the meaning of Eq. 2, FIG. 5B presents the elements of the equation for normal distribution. In FIG. 5B, value 518 represents the expected composite metric value, while value 520 represents the actual composite metric. The difference between the two is compared to the MAE value 522, which in the shown example equals (2/3)σ.

Figure 6:
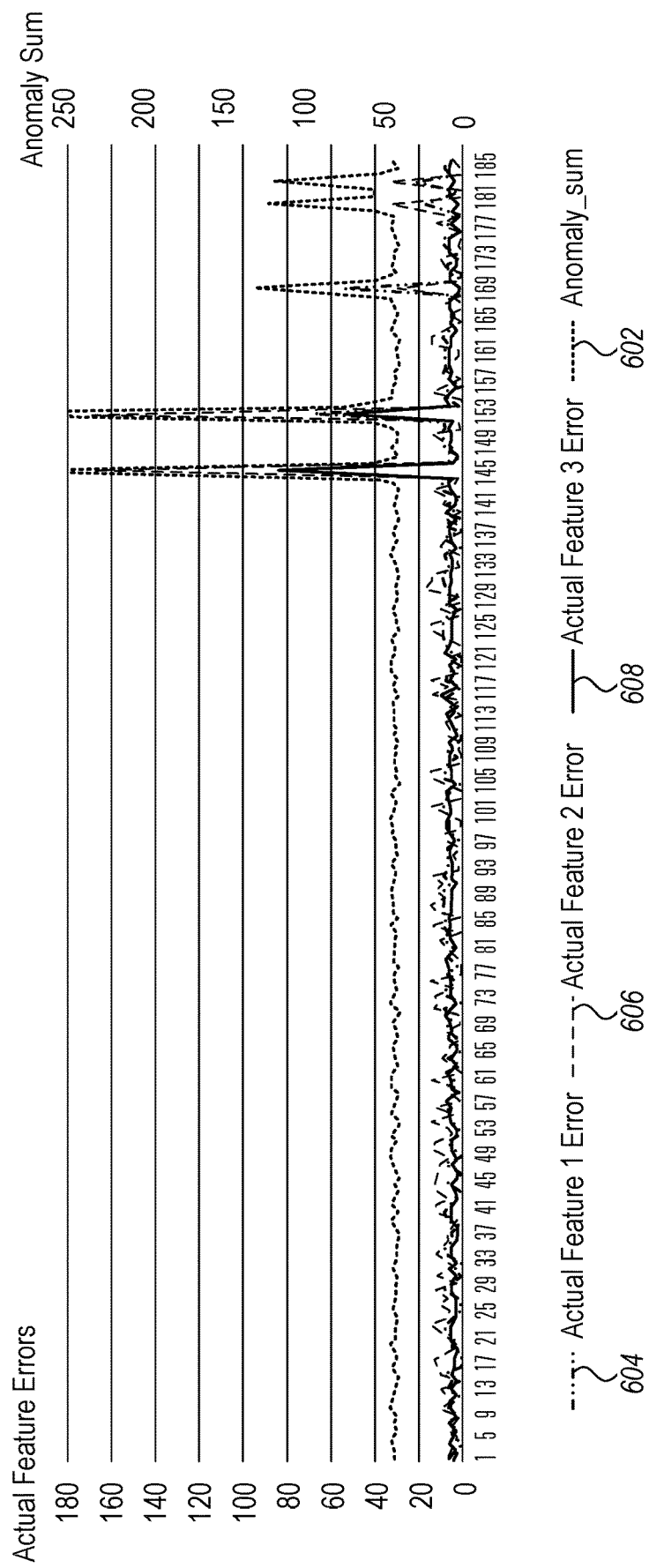
FIG. 6 is a graph that shows monitoring information comprising an anomaly sum and actual features anomaly events, in accordance with an exemplary embodiment of the present invention.

FIG. 6 is a graph that shows monitoring information comprising an anomaly sum 602 and actual features anomaly events 604, 606 and 608, in accordance with an exemplary embodiment of the present invention. In FIG. 6, one can see the correlation between total anomaly score 602 via top 3 Actual features errors 604, 606, 608.

It can be seen that total anomaly score 602 detects anomaly in the data according to actual feature error values.

The system configurations described herein, e.g., the configuration of system 100, are depicted purely by way of example. In alternative embodiments, any other suitable configurations can be used. The system configurations described herein, e.g., the configuration of system 100, may be implemented in software, using hardware, or using a combination of hardware and software elements. Some of the functions of system 100, e.g., functions of processor 1002, may be implemented in a general-purpose processor that is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address data centers, the methods and systems described herein can also be used in other applications relating monitoring.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data-center management, the method comprising:
   in a data center comprising multiple components, monitoring a plurality of performance measures of the components;
   automatically defining, by a processor, a set of composite metrics, each composite metric comprising a respective weighted combination of two or more performance measures from among the performance measures;
   establishing baseline values for the composite metrics, by the processor;
   detecting, by the processor, an anomalous deviation of one or more of the composite metrics from the respective baseline values, wherein an anomalous deviation is declared for a composite metric if the weighted combination of the composite metric is above a corresponding baseline value established for the composite metric; and
   changing a path of traffic or redefining a software port, responsive to detecting the anomalous deviation.

2. The method according to claim 1, wherein detecting the anomalous deviation comprises combining multiple deviations of multiple respective composite metrics to produce a combined deviation, and detecting the anomaly in the combined deviation.

3. The method according to claim 1, wherein automatically defining the set of composite metrics comprises running a Machine-Learning (ML) process that automatically selects groups of performance measures to be combined so as to form the composite metrics.

4. The method according to claim 1, wherein detecting the anomalous deviation comprises running a repetitive automated process that:
   monitors the performance measures;
   updates a definition of the composite metrics responsively to the monitored performance measures; and
   compares the updated composite metrics to the respective baseline values.

5. The method according to claim 4, further comprising updating the baseline equations during at least some repetitions of the repetitive automated process.

6. The method according to claim 1, wherein automatically defining the set of composite metrics comprises identifying correlations among the plurality of performance measures and defining the composite metrics responsively to the identified correlations.

7. The method according to claim 6, wherein identifying correlations among the plurality of performance measures is performed using a machine learning algorithm.

8. The method according to claim 1, further comprising presenting the anomalous deviation to a user.

9. The method according to claim 8, further comprising identifying one or more of the performance measures of the composite metric for which the anomalous deviation was detected, that are the dominant contributors to the deviation, and presenting the dominant contributors to the user.

10. The method according to claim 1, wherein automatically defining the set of composite metrics comprises running a Machine-Learning (ML) process that automatically assigns weights to the performance measures in the composite metrics.

11. A method for data-center management, the method comprising:
in a data center comprising multiple components, monitoring a plurality of performance measures of the components;
automatically defining, by a processor, a set of composite metrics, each composite metric comprising a respective weighted combination of two or more performance measures from among the performance measures;
identifying, by the processor, anomalous events in the data center, responsive to the monitored plurality of performance measures;
deriving, by the processor, a potential anomaly pattern of performance measures over a time duration in advance of the identified anomalous events for one or more of the components based on the composite metrics; and
changing a path of traffic or redefining a software port, responsive to identifying the anomalous events,
wherein automatically defining the set of composite metrics comprises running a Machine-Learning (ML) process that automatically performs selecting groups of performance measures to be combined so as to form the composite metrics.

12. The method according to claim 11, wherein deriving the potential anomaly pattern comprises estimating future anomaly times of the components.

13. The method according to claim 12, and comprising repeatedly updating the estimated future anomaly times based on newly collected composite metrics.

14. A method for data-center management, the method comprising:
running a plurality of software applications in a data center comprising multiple hardware components;
automatically creating periodically, by a processor, a mapping file that specifies:
(i) for each software application, a respective subset of one or more of the hardware components that are used by the software application, and
(ii) for each hardware component, a respective subset of one or more of the software applications that use the hardware component;
monitoring performance of the software applications and of the hardware components, to detect anomalous performance of one or more of the hardware components and of one or more of the software components;
identifying for the one or more of the hardware components detected to have anomalous performance, software applications that use the one or more hardware component, using the mapping file;
identifying for the one or more of the software components detected to have anomalous performance, hardware components that are used by the one or more software component, using the mapping file;
identifying, by the processor, an anomalous event based on the monitored performance and on the identified hardware and software components that were identified using the mapping file; and
changing a path of traffic or redefining a software port, responsive to identifying the anomalous event.

15. The method according to claim 14, wherein identifying the anomalous event comprises detecting anomalous performance of one or more of the hardware components, and, using the mapping, identifying one or more of the software applications associated with the anomalous performance.

16. The method according to claim 14, wherein identifying the anomalous event comprises detecting anomalous performance of one or more of the software applications, and, using the mapping, identifying one or more of the hardware components associated with the anomalous performance.

17. The method according to claim 14, further comprising:
establishing a baseline performance pattern for the software applications and the hardware components; and
updating the mapping in response to detecting an anomalous deviation from the baseline performance pattern.

18. The method according to claim 14, and comprising presenting the mapping file on a graphic user interface.

19. A system for data-center management, the system comprising:
an interface, which is configured to monitor a plurality of performance measures of multiple components in a data center; and
a processor, which is configured to:
automatically define a set of composite metrics, each composite metric comprising a respective weighted combination of two or more performance measures from among the performance measures;
establish baseline values for the composite metrics;
detect an anomalous deviation of one or more of the composite metrics from the respective baseline values, wherein an anomalous deviation is declared for a composite metric if the weighted combination of the composite metric is above a corresponding baseline value established for the composite metric; and
change a path of traffic or redefine a software port, responsive to detecting the anomalous deviation.

20. The system according to claim 19, wherein the processor is configured to detect the anomalous deviation by combining multiple deviations of multiple respective composite metrics to produce a combined deviation, and detecting the anomaly in the combined deviation.

21. The system according to claim 19, wherein the processor is configured to automatically define the set of composite metrics by running a Machine-Learning (ML) process that automatically performs one or more of:
selects groups of performance measures to be combined so as to form the composite metrics; and
assigns weights to the performance measures in the composite metrics.

22. The system according to claim 19, wherein the processor is configured to detect the anomalous deviation by running a repetitive automated process that:
monitors the performance measures;
updates a definition of the composite metrics responsively to the monitored performance measures; and
compares the updated composite metrics to the respective baseline values.

23. The system according to claim 22, wherein the processor is further configured to update the baseline values during at least some repetitions of the repetitive automated process.

24. A system for data-center management, comprising:
an interface, which is configured to monitor a plurality of performance measures of multiple components in a data center; and
a processor, which is configured to:
automatically define a set of composite metrics, each composite metric comprising a respective weighted combination of two or more performance measures from among the performance measures;
identify anomalous events in the data center, responsive to the monitored plurality of performance measures;
derive a potential anomaly pattern of performance measures over a time duration in advance of the identified anomalous events for one or more of the components based on the composite metrics; and
change a path of traffic or redefine a software port, responsive to identifying the anomalous events,
wherein the processor is configured to automatically define the set of composite metrics by running a Machine-Learning (ML) process that automatically selects groups of performance measures to be combined so as to form the composite metrics.

25. The system according to claim 24, wherein the processor is configured to derive the potential anomaly pattern by estimating future anomaly times of the components.

26. The system according to claim 25, wherein the processor is further configured to repeatedly update the estimated future anomaly times based on newly collected composite metrics.

27. A system for data-center management, comprising:
an interface, which is configured to communicate with a data center that comprises multiple hardware components and that runs a plurality of software applications; and
a processor, which is configured to:
automatically create periodically a mapping file that specifies:
(i) for each software application, a respective subset of one or more of the hardware components that are used by the software application, and
(ii) for each hardware component, a respective subset of one or more of the software applications that use the hardware component; and
monitor performance of the software applications and of the hardware components, to detect anomalous performance of one or more of the hardware components and of one or more of the software components;
identify for the one or more of the hardware components detected to have anomalous performance, software applications that use the one or more hardware component, using the mapping file;
identify for the one or more of the software components detected to have anomalous performance, hardware components that are used by the one or more software component, using the mapping file;
identify an anomalous event based on the monitored performance and on the identified hardware and software components that were identified using the mapping file; and
change a path of traffic or redefine a software port, responsive to identifying the anomalous event.

28. The system according to claim 27, wherein the processor is configured to identify the anomalous event by detecting anomalous performance of one or more of the hardware components, and, using the mapping, to identify one or more of the software applications associated with the anomalous performance.

29. The system according to claim 27, wherein the processor is configured to identify the anomalous event comprises detecting anomalous performance of one or more of the software applications, and, using the mapping, to identify one or more of the hardware components associated with the anomalous performance.

30. The system according to claim 27, wherein the processor is configured to:
establish a baseline performance pattern for the software applications and the hardware components; and
update the mapping in response to detecting an anomalous deviation from the baseline performance pattern.

* * * * *